Nov. 28, 1967 D. C. GAUBATZ 3,355,727

SHIELD UTILIZED AS FLUX PATH FOR MAGNETIC HEAD

Filed July 24, 1963

INVENTOR.
DONALD C. GAUBATZ

BY

Arthur W. Rollens
ATTORNEY

United States Patent Office 3,355,727

Patented Nov. 28, 1967

3,355,727

SHIELD UTILIZED AS FLUX PATH FOR MAGNETIC HEAD

Donald C. Gaubatz, Santa Clara, Calif., assignor, by mesne assignments, to the United States of America as represented by the Secretary of the Navy Filed July 24, 1963, Ser. No. 297,470
1 Claim. (Cl. 340—174.1)

The present invention relates to novel and improved apparatus for sensing and reproducing electrical signals recorded on a magnetic medium. More particularly it relates to a novel and improved magnetic sensitive reproduction head for use in an improved magnetic recording system.

Various types of magnetic recording systems, which are presently in use, employ flux sensitive recording and reproduction heads and take advantage of the so-called Hall effect which is exhibited by certain elements such as the germanium crystal. In accordance with the Hall effect, a potential gradient is developed across one pair of opposed faces of a rectangular prism of the crystal when a varying current and magnetic field are respectively developed across the other mutually perpendicular opposed faces of the prism. The potential gradient which is developed in this way is directly proportional to the current intensity and the applied magnetic field. Although recording and reproduction heads of this type provide many important advantages, they have also been found to be particularly sensitive to cross-talk and noise produced by stray magnetic fields.

It is therefore a principal object of the present invention to provide a novel and improved transducer device which is sensitive to variations of magnetic flux from a prerecorded medium and which is effectively shielded from stray magnetic and electric fields.

It is a further object of the present invention to provide a novel and improved transducer which translates variations of magnetic flux recorded perpendicular to the plane of a magnetic recording medium into proportionately varying electrical potential gradients and which incorporates a structure that simultaneously magnetically shields the entire transducer from external magnetic and/or electric fields.

Other objects and many of the attendant advantages of this invention will be readily appreciated as the same becomes better understood by reference to the following detailed description when considered in connection with the accompanying drawing wherein.

Figure 1:
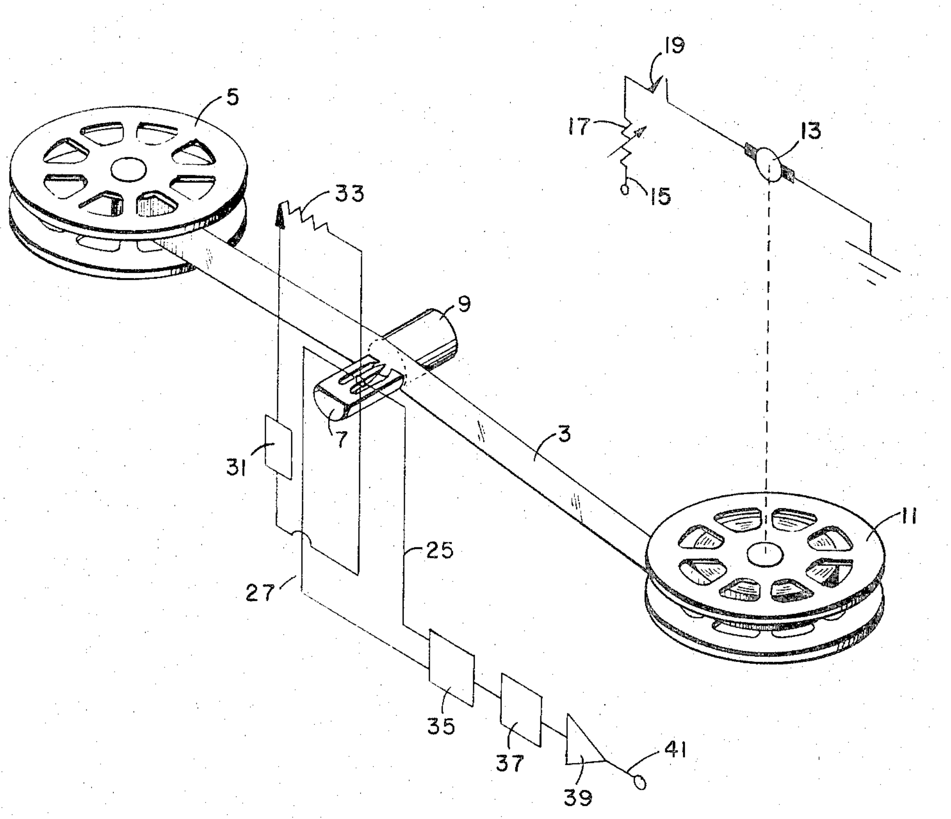
FIGURE 1 is a diagrammatic view of a preferred embodiment of the invention in which the improved magnetic reproduction head is shown partly in section.
Figure 2:
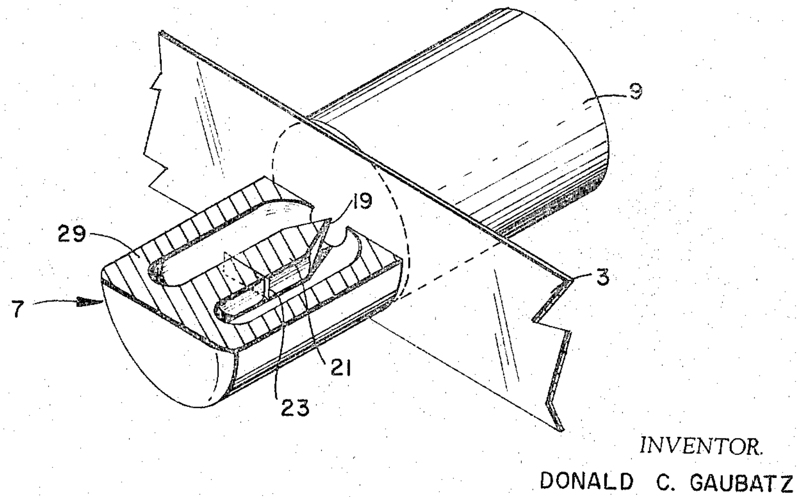
FIGURE 2 is an enlarged partly sectional view of the improved reproduction head shown in FIGURE 1.

A preferred embodiment of the invention is illustrated in the drawing. As shown therein, the prerecorded magnetic medium or tape 3 is preferably stored on the reel or the like 5. The outer extremity of the tape 5 is fed between the improved reproduction head 7 of the invention and its juxtaposed anvil 8 and is threaded on the take-up reel or the like 11. The electric motor 13 is mechanically coupled to the take-up reel 11 in any suitable manner and is energized by its armature circuit which extends from the power supply line 15 successively through the potentiometer 17, control switch 19, and the armature of the motor to ground.

The improved reproduction head of the invention includes the tip 19 of highly permeable magnetic material which is perpendicularly disposed to the tape 3 between its storage and take-up reels 5 and 11. The extremity of the tip 19 away from the tape 3 tapers outwardly and merges with the highly permeable cylindrical core 21. The thin rectangular prismatic flux sensitive element or crystal 23 is disposed as shown between alined half sections of the core 21 and is formed from a suitable material that exhibits the Hall effect. As will be more apparent hereinafter, the Hall element or crystal 23 therefore translates variations of flux through the core into proportional electrical potential gradients across conductors 25 and 27 which are secured in any suitable manner to one pair of opposed thin edges of the element 23. The outer end of the core 21 then merges into the concentric magnetic shield member or the like 29 which encloses the entire core and Hall element structure and terminates adjacent an annular portion of the tape 3 about the core tip 19. The highly permeable anvil element or the like 9 is preferably equal in diameter to the outside diameter of the shield member 29 and is disposed in close proximity to the opposite side of the tape 3 in substantial alinement with the reproduction head structure. Current is supplied from any suitable source of potential 31 through the potentiometer 33 to the other pair of thin edges of the Hall element 23. The source 31 is preferably an A.C. supply which operates at a frequency that is suitable to provide a carrier signal which is amplitude modulated by the flux variations from the tape 3. Variations in the potential gradient developed across conductors 25 and 27 are preferably successively fed through the filter network or the like 35, the demodulator 37 and the amplifier 39 to the output conductor 41.

In operation the prerecorded magnetic medium or tape 3 is directed between the reproduction head 7 and the anvil 9 at a preselected suitable speed controlled by potentiometer 17. The amplitude of the carrier signal supplied from source 31 to the Hall element 23 is then controlled by suitable adjustment of potentiometer 33. Flux from the prerecorded track on the tape 3 is then picked up by the tip 19 and guided through the core 21 and the Hall element 23. The flux then returns through the concentric shield 29 of the head and through the anvil 9 to the opposite side of the prerecorded track on the tape 3. The relatively large cross-sectional area of the shield 29 and the anvil 9 provide a low reluctance flux path about the reproducing tip 19, core 21, and Hall element 23. The small cross-sectional area of the tip 19 and the gaps formed by the Hall element 23 in the core 21, however, provide a relatively high reluctance flux path. Thus, stray flux external to the head 7 tends to be shunted through the shield and does not effect the centrally located Hall element 23. In accordance with the Hall effect variations in the intensity of flux from the tape 3 through the Hall element 23 then produce proportionate variations in potential across conductors 25 and 27. These variations in potential across conductors 25 and 27 are then successively fed through the filter network 35, which suppresses undesired frequency components of the exciting current in the Hall circuit, and through the conventional demodulator 37 and amplifier 39 to any suitable output circuit in which the signals are to be evaluated, compared and/or studied.

Obviously many modificatons and variations of the present invention are possible in the light of the above teachings. It is therefore to be understood that within the scope of the appended claim the invention may be practiced otherwise than as specifically described.

What is claimed is:

Apparatus for translating a signal recorded on magnetic medium into an electrical output, said apparatus comprising:

(a) a magnetic core perpendicularly disposed adjacent and contiguous with one side of the medium and tapered inwardly to form a tip of reduced cross-section adjacent the medium;

(b) a thin element of material exhibiting the Hall effect disposed in series with the core;

(c) a concentric magnetic shield which is magnetically coupled to the outer end of the core, which encloses the entire core and Hall element structure and which terminates adjacent and contiguous with an annular portion of the medium about the tip;

(d) and a magnetic anvil disposed in substantial alignment with the shield adjacent and contiguous with the opposite side of the medium so as to provide a low reluctance return path to the tip of the magnetic core.

References Cited

UNITED STATES PATENTS

| | | | |
|---|---|---|---|
| 2,786,897 | 3/1957 | Schwarz | 179—100.2 |
| 2,804,506 | 8/1957 | Schurch et al. | 340—174.1 |
| 2,907,834 | 10/1959 | Duinker et al. | 179—100.2 |
| 2,922,231 | 1/1960 | Witt et al. | 340—174.1 |
| 3,041,414 | 6/1962 | Gratian | 179—100.2 |
| 3,043,918 | 7/1962 | Fawcett | 179—100.2 |
| 2,514,577 | 7/1950 | Heller | 179—100.2 |
| 2,523,515 | 9/1950 | Porter | 179—100.2 |
| 3,200,207 | 8/1965 | Rainer et al. | 179—100.2 |

FOREIGN PATENTS

| | | |
|---|---|---|
| 214,652 | 8/1941 | Germany. |

BERNARD KONICK, *Primary Examiner.*

V. P. CANNEY, *Assistant Examiner.*